Aug. 23, 1966     K. MACHER ET AL     3,267,803
FOUR-COMPONENT VARIFOCAL ATTACHMENT WITH
MOVABLE NEGATIVE LENS MEMBERS
Filed Jan. 21, 1965
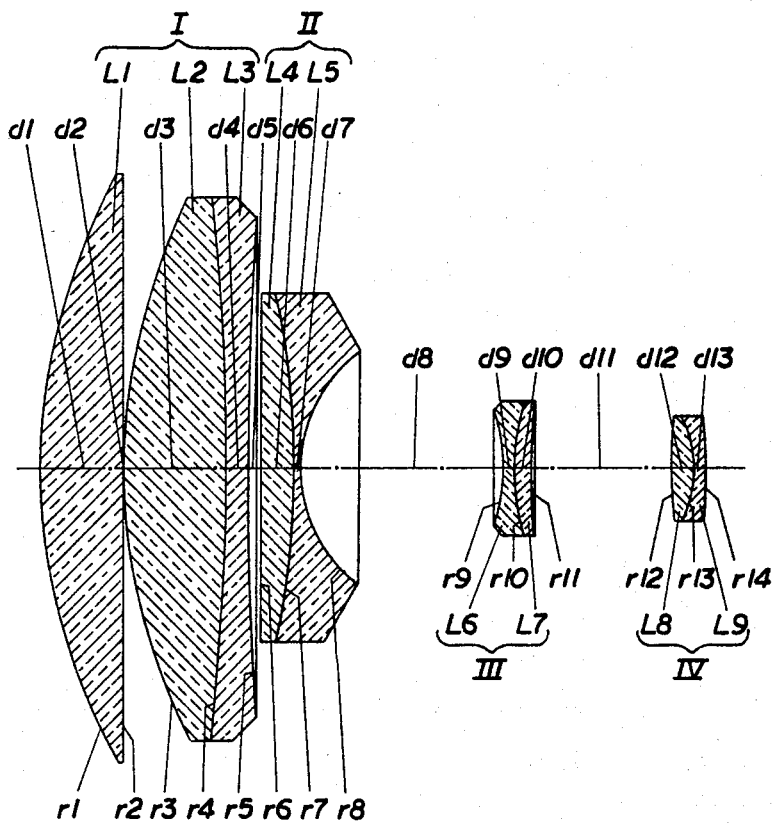
Karl Macher
Günter Klemt
INVENTOR.
BY Karl F. Ross
AGENT

3,267,803
FOUR-COMPONENT VARIFOCAL ATTACHMENT WITH MOVABLE NEGATIVE LENS MEMBERS
Karl Macher and Günter Klemt, Bad Kreuznach, Germany, assignors to Jos. Schneider & Co., Bad Kreuznach, Germany, a corporation of Germany
Filed Jan. 21, 1965, Ser. No. 427,064
Claims priority, application Germany, Aug. 17, 1960, Sch 28,339
2 Claims. (Cl. 88—57)

This application is a continuation-in-part of our copending application Ser. No. 126,307, filed July 24, 1961, and now abandoned.

In our U.S. Patent No. 3,057,257, issued Oct. 9, 1962, and also in our aforementioned application Ser. No. 126,307, there have been disclosed varifocal attachments for camera objectives designed to reduce the aberrations normally encountered in such systems; they include a fixed positively refractive front component on the object side of the system, a fixed positively refractive rear component on the image side, or side of the shorter light rays, and two movable intermediate components of negative refractivity and of relatively small dimensions. Whereas the attachment disclosed in U.S. Patent No. 3,057,257 has a varifocal ratio of about 1:4 realizable with an aperture ratio of 1:2.8, it is the object of the present invention to improve both these ratios while maintaining the residual aberrations of the system small and substantially constant throughout the range of adjustment.

The foregoing object is realized, in accordance with a feature of this invention, by the provision of an essentially afocal attachment of the type described above wherein, preferably, each of the components has at least one cemented surface and wherein the focal lengths of the two movable negative components differ by not more than ±25%; advantageously, as in the systems disclosed in the patent and the application referred to, the focal length of the fixed rear component is equal to or less than 75% of that of the fixed front component. It has further been found that, for minimizing spherical aberrations, the rear component should be biconvex and so proportioned that the radius of its front surface be at least equal to the absolute value of the radius of its rear surface.

The invention will be described in greater detail with reference to the sole figure of the accompanying drawing which shows a varifocal front attachment embodying the invention.

The system shown in the drawing is a four-component attachment consisting of a fixed front component I of positive refractivity, a first movable intermediate component II of negative refractivity, a second movable intermediate component III also of negative refractivity, and a fixed, positively refracting rear component IV. Component I consists of a biconvex singlet L1 (radii $r1$, $r2$ and thickness $d1$) and, separated from it by a small air space $d2$, of a doublet composed of a positive lens L2 (radii $r3$, $r4$ and thickness $d3$) and a negative lens L3 (radii $r4$, $r5$ and thickness $d4$). A variable air space $d5$ separates this doublet from component II which consists of a positive lens L4 (radii $r6$, $r7$ and thickness $d6$) cemented onto a negative lens L5 (radii $r7$, $r8$ and thickness $d7$). Another variable air space $d8$ exists between lens L5 and component III which consists of a negative lens L6 (radii $r9$, $r10$ and thickness $d9$) cemented onto a positive lens L7 (radii $r10$, $r11$, thickness $d10$). The latter lens is separated by a variable air space $d11$ from component IV which consists of a positive lens L8 (radii $r12$, $r13$ and thickness $d12$) cemented onto a negative lens L9 (radii $r13$, $r14$ and thickness $d13$).

Representative values for the radii $r1$ to $r14$ and the thicknesses and separations $d1$ to $d13$ of lenses L1 to L9, based upon a reference parameter of numerical value 100 which may be the median focal length of an objective system including the illustrated attachment, along with their refractive indices $n_d$ and the Abbé numbers $v$, are given in the following Table I for a system which retains its afocal character in all positions of adjustment and whose linear magnification ratio varies from 0.56 to 2.6, this corresponding to a varifocal ratio of about 1:5; the system is particularly adapted for use with objectives for 8-mm. film cameras having a focal length of 13 mm. and an aperture ratio of 1:1.8.

TABLE I

| Component | Lens | Radii | Thicknesses and Separations | $n_d$ | $v$ |
|---|---|---|---|---|---|
| I<br>$f_I = +65.25$ | L1 | $r_1 = +55.92$<br>$r_2 = +381.00$ | $d_1 = 8.00$<br>$d_2 = 0.14$ | 1.58913<br>Air Space | 61.2 |
| | L2 | $r_3 = +57.94$<br>$r_4 = -139.00$ | $d_3 = 10.10$ | 1.62041 | 60.3 |
| | L3 | $r_5 = +232.30$ | $d_4 = 2.00$ | 1.80518 | 25.5 |
| | | | $d_5 = 1.22$ | Variable Air Space | |
| II<br>$f_{II} = -27.16$ | L4 | $r_6 = +381.00$<br>$r_7 = -83.90$ | $d_6 = 3.15$ | 1.80518 | 25.5 |
| | L5 | $r_8 = +14.13$ | $d_7 = 1.00$ | 1.58913 | 61.2 |
| | | | $d_8 = 19.25$ | Variable Air Space | |
| III<br>$f_{III} = -25.49$ | L6 | $r_9 = -20.95$<br>$r_{10} = +21.45$ | $d_9 = 1.00$ | 1.71300 | 53.9 |
| | L7 | $r_{11} = +88.56$ | $d_{10} = 1.80$ | 1.80518 | 25.5 |
| | | | $d_{11} = 13.54$ | Variable Air Space | |
| IV<br>$f_{IV} = +35.29$ | L8 | $r_{12} = +55.92$<br>$r_{13} = -10.48$ | $d_{12} = 2.30$ | 1.65830 | 57.3 |
| | L9 | $r_{14} = -45.15$ | $d_{13} = 1.00$ | 1.62588 | 35.6 |
| | | | $d_{total} = 64.50$ | | |

The air spaces $d5$, $d8$ and $d11$ may be varied concurrently in order to change the magnification ratio of the system within the aforestated limits in accordance with the following Table II:

TABLE II

| Magnification Ratio | Variable Air Spaces | | |
|---|---|---|---|
| | $d_5$ | $d_8$ | $d_{11}$ |
| 0.56 | 1.22 | 19.17 | 13.62 |
| 0.74 | 7.89 | 12.98 | 13.14 |
| 1.12 | 15.95 | 6.67 | 11.40 |
| 1.48 | 20.68 | 4.21 | 9.12 |
| 1.86 | 23.70 | 3.64 | 6.67 |
| 2.23 | 25.71 | 4.07 | 4.23 |
| 2.80 | 27.59 | 5.68 | 0.75 |

From the foregoing Table I it will be noted that the focal length $f_{IV}$ of the rear component IV, having a magnitude of 35.29, is less than 75% of the focal length $f_I$ of the front component I, having a magnitude of 65.25; also the focal length $f_{II}$ of component II, of magnitude 27.16, will be seen to exceed the focal length $f_{III}$ of component III, having a magnitude of 25.49, by less than 25%. The radius $r12$ of the front surface of the rear component IV is greater than the absolute value of the radius $r14$ of the corresponding rear surface to minimize spherical aberration. Such aberration is further suppressed by the fact that the cemented internal surface $r13$ of the biconvex doublet L8, L9, constituting component IV, is strongly curved toward the image side of the system and is collective in character since the refractive index of lens L8 exceeds that of lens L9.

We claim:
1. A varifocal attachment for an optical objective, consisting of four components separated from one another by variable air spaces and together constituting an afocal system, said components including a fixed front component of positive refractively constituted by two air-spaced positive members of strong forward convexity of which the first one is a singlet and the second one is a doublet, a first movable intermediate component constituted by a doublet of negative refractivity, a second movable intermediate component constituted by a doublet of negative refractivity, and a fixed rear component of positive refractivity, said rear component having a focal length equal to at most 75% of the focal length of said front component, the focal length of said first intermediate component exceeding that of said second intermediate component in absolute value and differing from it by at most 25%, said rear component being a biconvex doublet having a front surface whose radius of curvature at least equals in absolute magnitude the radius of curvature of its rear surface, said biconvex doublet further having a collective internal surface strongly curved toward the image side of the system.

2. An attachment according to claim 1 wherein the radii $r1$ to $r14$ and the thicknesses and separations $d1$ to $d13$ of the lenses L1 to L9 forming part of said front component I, said first intermediate component II, said second intermediate component III and said fourth intermediate component IV, based upon a reference parameter of numerical value 100, the indices of refraction $n_d$ of all of said lenses and their Abbé numbers $\nu$ have numerical values substantially as given in the following table:

TABLE I

| Component | Lens | Radii | Thicknesses and Separations | $n_d$ | $\nu$ |
|---|---|---|---|---|---|
| I | L1 | $r_1 = + 55.92$ | $d_1 = 8.00$ | 1.58913 | 61.2 |
| | | $r_2 = +381.00$ | $d_2 = 0.14$ | Air Space | |
| | L2 | $r_3 = + 57.94$ | $d_3 = 10.10$ | 1.62041 | 60.3 |
| | | $r_4 = -139.00$ | $d_4 = 2.00$ | 1.80518 | 25.5 |
| | L3 | $r_5 = +232.30$ | $d_5 = 1.22$ | Variable Air Space | |
| II | L4 | $r_6 = +381.00$ | $d_6 = 3.15$ | 1.80518 | 25.5 |
| | | $r_7 = - 83.90$ | $d_7 = 1.00$ | 1.58913 | 61.2 |
| | L5 | $r_8 = + 14.13$ | $d_8 = 19.25$ | Variable Air Space | |
| III | L6 | $r_9 = - 20.95$ | $d_9 = 1.00$ | 1.71300 | 53.9 |
| | | $r_{10} = + 21.45$ | $d_{10} = 1.80$ | 1.80518 | 25.5 |
| | L7 | $r_{11} = + 88.56$ | $d_{11} = 13.54$ | Variable Air Space | |
| IV | L8 | $r_{12} = + 55.92$ | $d_{12} = 2.30$ | 1.65830 | 57.3 |
| | | $r_{13} = - 10.48$ | $d_{13} = 1.00$ | 1.62588 | 35.6 |
| | L9 | $r_{14} = - 45.15$ | | | |

References Cited by the Examiner

UNITED STATES PATENTS 2,746,350  5/1956  Hopkins _____ 88—57
3,027,805  4/1962  Yamaji _____ 88—57

JEWELL H. PEDERSEN, *Primary Examiner.*

J. K. CORBIN, *Assistant Examiner.*